United States Patent [19]

Barry et al.

[11] Patent Number: 4,933,194
[45] Date of Patent: Jun. 12, 1990

[54] LOW OIL CORRUGATED POTATO CHIP

[75] Inventors: David L. Barry, Lewisville; Stephen C. Chester, Carrollton, both of Tex.; Bruce E. Parker, Indianapolis, Ind.; Michael G. Topor, Carrollton, Tex.

[73] Assignee: Frito-Lay, Inc., Dallas, Tex.

[21] Appl. No.: 305,225

[22] Filed: Feb. 1, 1989

[51] Int. Cl.$^5$ ............................................. A23L 1/217
[52] U.S. Cl. .................... 426/144; 426/637; 426/808
[58] Field of Search ............... 426/144, 438, 637, 808, 426/804

[56] References Cited

U.S. PATENT DOCUMENTS

| | | | |
|---|---|---|---|
| 2,769,715 | 11/1956 | Stahmer | 426/144 |
| 4,508,739 | 4/1985 | Ryan | 426/144 |
| 4,511,586 | 4/1985 | Fitzwater et al. | 426/637 X |
| 4,537,786 | 8/1985 | Bernard | 426/438 |
| 4,650,684 | 3/1987 | Penrose | 426/144 |
| 4,680,191 | 7/1987 | Budd et al. | 426/144 X |
| 4,756,916 | 7/1988 | Dreher et al. | 426/637 X |

FOREIGN PATENT DOCUMENTS 701899  1/1965  Canada ............................. 426/144

Primary Examiner—Arthur L. Corbin
Attorney, Agent, or Firm—Thomas P. Schur

[57] ABSTRACT

Low oil potato chips having corrugated cross-sectional configurations wherein the value of amplitude/period ranges from about 0.35 to about 0.50 and wherein ridges on one face of the corrugated chip are in-phase with grooves on the opposing face of the corrugated chip.

4 Claims, 5 Drawing Sheets

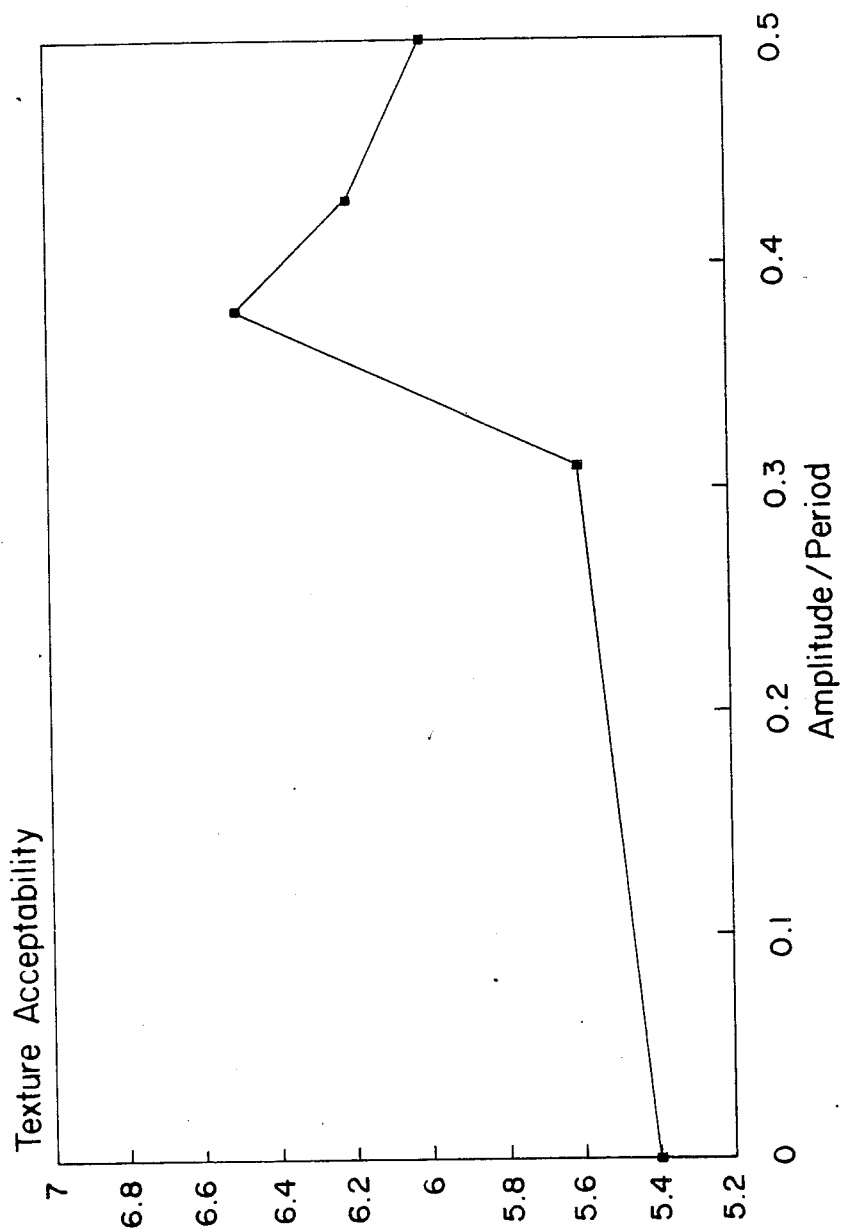

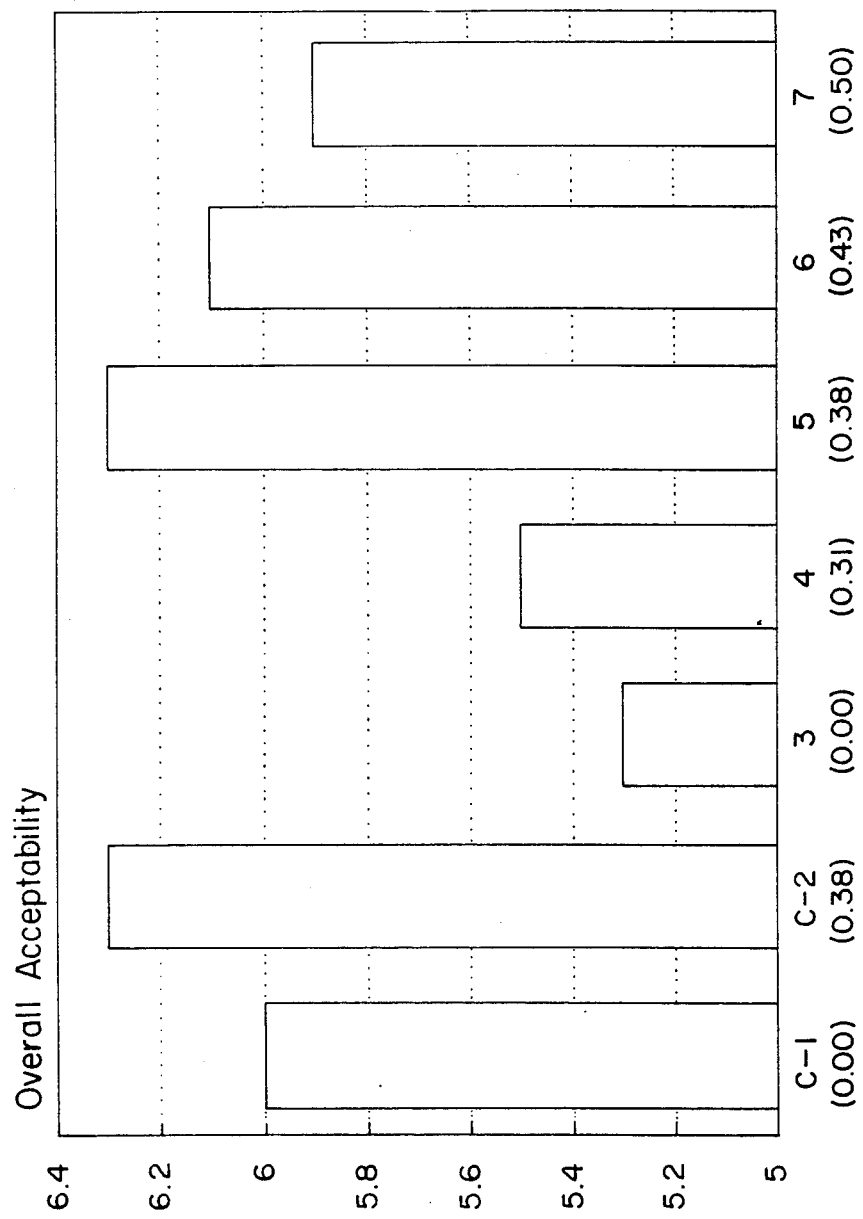

LOW OIL CORRUGATED POTATO CHIP

FIELD OF THE INVENTION

The present invention relates to novel low oil potato chip products. More specifically, the present invention pertains to low oil potato chip products made from potato slices having specific cross-sectional configurations that provide enhanced textural, flavor and other potato chip characteristics.

BACKGROUND OF THE INVENTION

Potato chip products are popular snack food items that have wide consumer appeal. It is considered that the combination of potato, oil and salt flavors, and the crunchy texture creates the preferred potato chip taste sensation. However, consumers have also expressed concerns for their total dietary intake of fats and oils and view potato chips, with a typical fat content of between thirty and forty weight percent, as other than a health food. In response to this, potato chip manufacturers have sought to produce a potato chip which retains the flavor and texture characteristics of conventional potato chips, but with a significantly reduced fat content.

One example of low fat potato chip processing includes copending and coassigned patent application, U.S. Ser. No. 305,256, entitled "Low Fat Potato Chip Process." This disclosure describes an optimized process for producing a low fat potato chip wherein potato slices are par-fried at a temperature between 149° C. and 182° C. (300° to 360° F.) to a moisture content of from about four weight percent to about ten weight percent; the par-fried slices are exposed to superheated steam maintained at between 138° C. and 171° C. (280° and 340° F.) and velocities of from 488 meters/minute (1,600 ft/min.) to 671 meters/minute (2,200 ft/min.) for from 60 to 120 seconds to remove surface fat from the par-fried slices; and then exposing the de-fatted; par-fried slices to additional dehydrating to finish-drying the slices to less than about two weight percent moisture to yield low fat potato chips.

Other processes for decreasing the fat content of potato chips include British Patent Specification 1,519,049 entitled "Improvements in or Relating to Methods and Apparatus for the Preparation of Deep-Fried Sliced Potatoes, So-called Potato Crisps" which teaches a process that includes the use of superheated steam to strip surface fat from fried potato chips; U.S. Pat. No. 4,537,786, entitled "Method of Preparing Low Oil Fried Potato Chips" that discloses the use of hot air blasts to reduce the oil content of potato slices while also finish-drying the slices to a desired moisture content to produce chips; and U.S. Pat. No. 4,721,625 entitled "Process for Preparing Low Oil Potato Chips" which describes par-frying potato slices, deoiling the slices in the presence of saturated steam blasts, and drying the deoiled slices with superheated steam, all in the absence of oxygen, to yield low oil potato chips.

Additional proposals for processing low oil potato chips are known to those familiar with this art. Each of these disclosures teach processing variables that must be controlled in order to yield low fat products. Unfortunately, when the low fat goal is reached there is also a corresponding reduction in one or more of the organoleptic properties of the product such as flavor, texture, appearance and color. It is also noteworthy that these low oil processing disclosures do not teach processing sliced whole potatoes wherein the potato slice has surfaces that are other than smooth, flat surfaces.

Separate and aside from low fat potato chip processing is technology devoted to slicing whole potatoes wherein the slice surface is other than flat. Examples of different slice surfaces include "wavy cuts" which have smooth regularly undulating surfaces; and "V cuts" which have sharp angular ridges and valleys. Potato chips with these slice surfaces are collectively referred to as corrugated potato chips. Examples of various corrugated chips can be found in U.S. Pat. No. 2,769,715 to Stahmer entitled "Sliced Corrugated Potato Products," U.S. Pat. No. 4,508,739 to Ryan entitled "Potato Product with Opposite Corrugations of Different Frequencies;" and U.S. Pat. No. 4,650,684 to Penrose, entitled "Reduction in Phase-Locking of Corrugated Chips and Products Thereof."

Although various potato chip structures are known, the field of low oil potato chip technology has concentrated solely on controlling processing variables. With this convergent approach, there still remains a void in the area of low oil potato chips as the ability does not now exist to consistently produce a low fat potato chip that is rated at parity or above to conventional potato chips by consumers.

It is one object of the present invention to provide a low fat potato chip having high consumer acceptability relative to other low fat potato chips.

It is another object of the present invention to provide a low fat potato chip having consumer acceptability that is about at parity with conventionally prepared potato chips.

It is yet another object of this invention to provide low fat potato chips having novel constructions that enhance the organoleptic properties of the potato chip.

These and other objects of the present invention will become evident to one skilled in the art from the below description of the invention and the appended claims.

SUMMARY OF THE INVENTION

The present invention relates to a low fat potato chip product having a fat content of less than about twenty-five weight percent, based on the total weight of the potato chip product, and having a corrugated cross-sectional construction wherein the value of amplitude/period ranges from about 0.35 to about 0.5. As used herein, the terms "low fat" and "low oil" are considered to have an equivalent meaning, referring to a potato chip having less than twenty-five weight percent fat based on the total weight of the potato chip.

The potato chips of this invention may be made by any of the known processes for producing low oil potato chips from potato slices and, when compared to similarly produced low fat potato chips having different amplitude/period values, will exhibit organoleptic characteristics that are preferred characteristics. Using state-of-the-art low oil potato chip processing, low oil potato chips can be made that have consumer acceptabilities that are at least at about parity with corresponding potato chips having conventional fat contents, which are generally between about 30 and 40 weight percent.

DETAILED DESCRIPTION OF THE INVENTION

As used herein, the following terms referring to the cross-sectional construction of a potato chip shall have the following meaning: "Amplitude" refers to the vertical height of a peak or ridge of a corrugated potato chip as measured from an adjacent valley. "Period" means the distance between the centerlines of two consecutive peaks or two consecutive valleys on one corrugated potato chip surface. "Web thickness" is an average measurement of the instantaneous perpendicular distance between the two opposing faces of a potato chip. The web thickness of a corrugated potato chip can be calculated by dividing the cross-sectional area by the arc length.

The phrase "low fat potato chip" as used herein refers to a potato chip product having a fat content of less than about twenty-five weight percent, based on the total weight of the potato chip.

In accordance with the present invention, it has surprisingly been shown that, under about identical preparatory conditions, including similar web thicknesses, low-fat potato chips made from potato slices having differing cross-sectional constructions possess similar low oil contents, but differing degrees of consumer preferences. It has been found that by maintaining the minimum web thickness, which is a function of potato variety and solids, with constructions which have a value of amplitude/period between about 0.35 and 0.50 results in potato chip products which have both low oil content and organoleptic characteristics that are consistently preferred over other low oil potato chips and are about at parity with conventional oil content potato chips. Preferably the amplitude/period values are between 0.35 and 0.45. It is to be noted that no additional processing considerations are required to produce low oil potato chips having the cross-sectional constructions of this invention, apart from those processing parameters necessary to yield a low oil potato chip of any other configuration.

BRIEF DESCRIPTION OF THE DRAWINGS

The present invention will become apparent from the following description thereof when considered together with the accompanying drawings which are set forth as being exemplary of embodiments of the present invention and are not intended in any way, to be limitative thereof and wherein:

FIGS. 2A–C are graphs of consumer acceptabilities of various attributes of low oil potato chips plotted against the value of amplitude/period of the same chips; and FIG. 3 is a bar graph of overall consumer acceptance for various low oil potato chips having differing values of amplitude/period, and for control potato chips having conventional oil contents.

FIG. 1 portrays a cross-sectional view of a potato chip wherein the ridges on one face are in-phase with the grooves on the opposing face thereof. The cross-section of the potato chip is identified by an amplitude 1, a period 2 and a web thickness 3. In accordance with the present teaching, the amplitude may range from about 0.80 mm (0.031 in.) to about 2.20 mm. (0.087 in.), provided that the value of amplitude/period is within the range of from 0.3 to 0.5. Preferably the amplitude ranges from about 1.03 mm (0.040 in.) to about 1.95 mm. (0.077 in.), and the value of amplitude/period is about 0.35 to 0.45.

EXAMPLES

FIGS. 2A–C and FIG. 3 are discussed hereinbelow with reference to the following examples which are provided to demonstrate the subject invention and are not intended to be limitative thereof. In these examples low oil potato chips having various cross-sectional constructions were prepared and evaluated for texture, flavor and shape, and compared to conventionally prepared potato chips for overall consumer acceptance.

New crop potatoes having a specific gravity of about 1.082 were peeled and passed through an industrial slicer, Model CC available from the Urschel Company, Valpariso, Ind. The slicer was fitted with various blade configurations to form slices having different cross-sectional constructions.

The cross-sectional data for each type of chip cut is shown in Table 1 below, which is based on measuring the finished low oil and control potato chip products by caliper and shadow-graph measurements.

Figure 1:
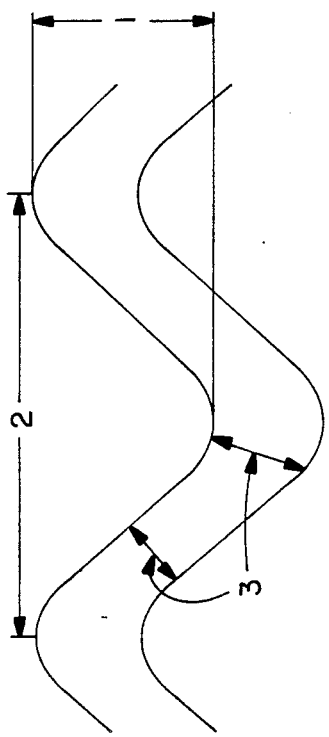
FIG. 1 is a cross-sectional view of a potato chip product in accordance with the present invention.

Unless otherwise noted, all products formed had cross-sectional constructions wherein the ridges on one face of the product were in-phase with the grooves on the opposing face of the product, as depicted in FIG. 1, although such in-phase constructions are not considered to be limitative of the subject invention. Each slice configuration was cut to have a web thickness of about 2 mm. Potato slices having about equal web thicknesses, when fried under similar conditions, have been found to produce low oil potato chips having about equal oil contents. By utilizing slices having about equal web thicknesses, finished chip oil content was removed as a significant variable when the potato chips were evaluated for consumer acceptabilities.

The slices were transferred to a continuous potato chip fryer which contained partially hydrogenated soybean oil. For control chips of conventional potato chip oil content, C-1 and C-2, the frying oil was kept at about 188° C. (370° F.) and the slices were fried to a final moisture content of about 1.0–1.5 weight percent and an oil content of between 30 and 32 weight percent, based on the weight of the fried chips.

Low fat potato chips were processed by par-frying the potato slices in the frying oil, which was maintained at about 171° C. (340° F.), to a moisture content of about 10–13 weight percent, based on the weight of the par-fried slices. In each run, the dwell time of the potato slices in the frying oil was adjusted to compensate for slice thickness variations so that the desired moisture content was obtained in the slices exiting the fryer. The dwell time ranged from a minimum of about 110 seconds for Product No. 4 to a maximum of about 170 seconds for Product No. 5.

After par-frying, the slices were introduced as a 7.6 cm (3 inch)-thick continuous bed to a de-oiling and dehydrating unit, identified as an LOC-300 available from Heat and Control, Inc., South San Francisco, Calif. This unit was operated in accordance with the teaching of British Patent Specification 1,519,049, which teaching is discussed hereinabove and which is incorporated herein by reference. The unit removed oil from, and finish-dried, the slices by means of superheated steam. The temperature of the deoiling unit was maintained at about 149° C. (300° F.) and superheated steam impinged on the 7.6 cm thick bed of par-fried slices at a speed of about 549 meters/minute (1,800 ft/min). The dwell time of a potato slice in the deoiling unit was about 120 seconds and the final moisture content of the potato chips exiting the de-oiling and dehydrating unit ranged from about 1.0 to about 1.7 weight percent, based on the weight of the chips exiting the unit. The oil content of the chips exiting the deoiling and dehydrating unit ranged from about 16 to about 20 weight percent.

The so-formed chips were salted in a tumbler utilizing a volumetric feeder. The final oil and moisture contents of each product are shown in Table 1, expressed as weight percents based on the total weight of the finished product.

TABLE 1

PRODUCT CHARACTERISTICS

| Product No. | Amplitude (mm) | Period (mm) | Amplitude Period | Oil Content (weight percent) | Moisture Content (weight percent) |
|---|---|---|---|---|---|
| C-1* | — | — | 0.00 | 32.0 | 0.9 |
| C-2 | 1.03 | 2.73 | 0.38 | 30.0 | 1.5 |
| 3* | — | — | 0.00 | 19.9 | 1.5 |
| 4 | 2.07 | 6.63 | 0.31 | 15.8 | 1.7 |
| 5 | 1.03 | 2.73 | 0.38 | 18.9 | 1.2 |
| 6 | 1.95 | 4.49 | 0.43 | 18.5 | 1.1 |
| 7 | 1.82 | 3.64 | 0.50 | 18.3 | 1.4 |

*Flat cut chip having approximately smooth slice surface.

The low-fat finished products were then used in consumer testing to determine their relative acceptances based on organoleptic characteristics such as texture, shape and flavor.

One-hundred ninety-two respondents evaluated a control plus four of nine samples in a sequential monadic manner. Order of presentation and blocking were randomized. Data were analyzed at the 90% confidence level using the General Linear Models Analysis of Variance. Respondent, sample and replication were removed as sources of variation.

Figure 2B:
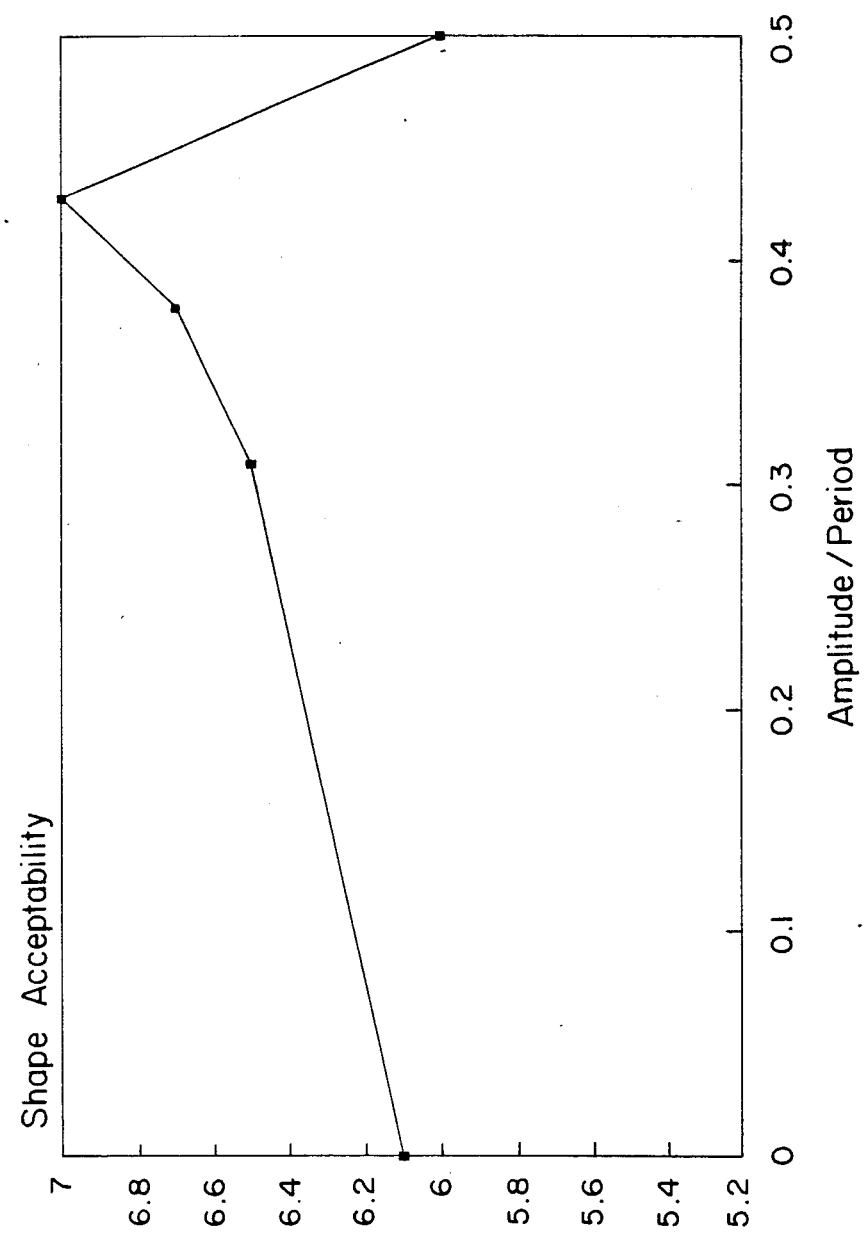
Figure 2C:
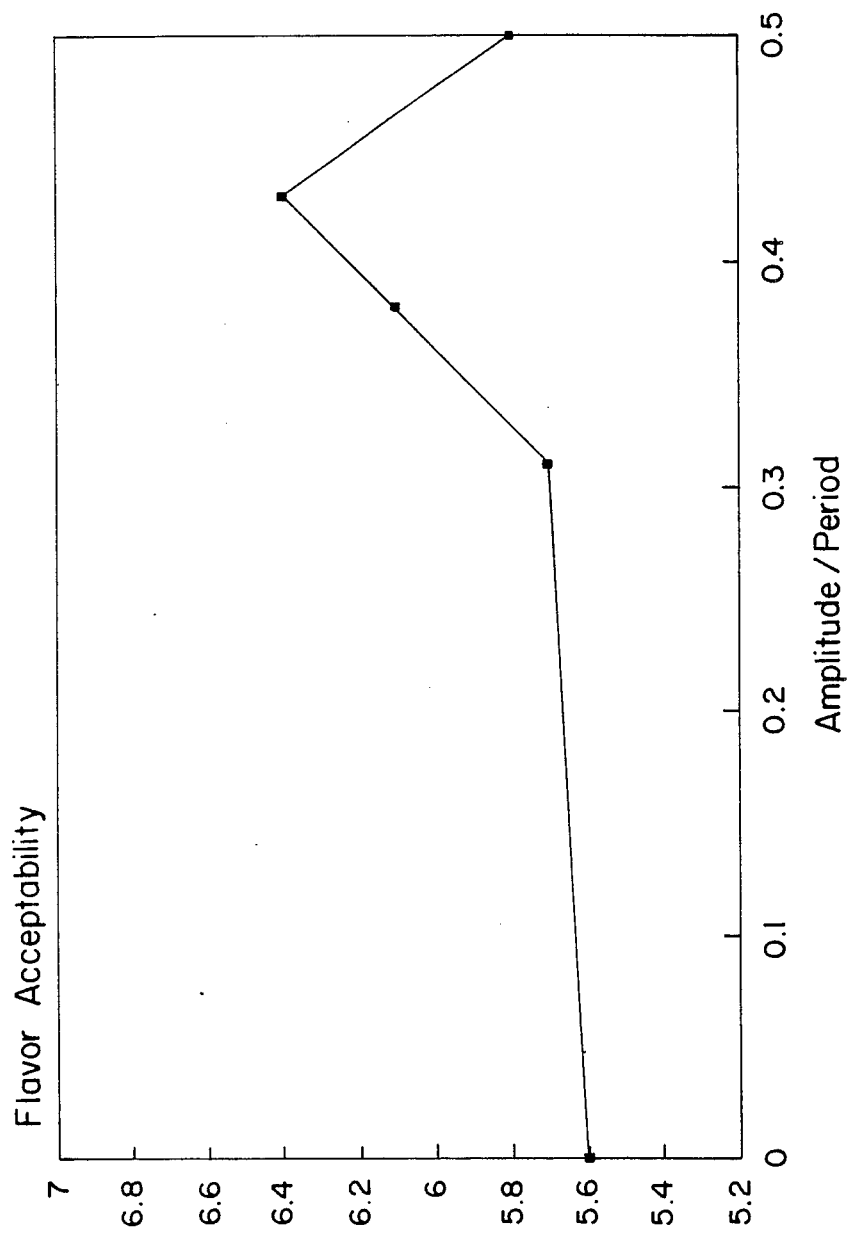

The results of testing for the three organoleptic attributes are shown graphically in FIGS. 2A, 2B and 2C, respectively, as a function of the value of amplitude/period of the products. As is evident in each figure, the cross-sectional construction of the potato chip, as represented by the amplitude/period value, directly influences the acceptance of the characteristic being measured. Favorable responses to each attribute are markedly increased within the amplitude/period range from about 0.35 to about 0.45.

The overall acceptabilities of the low fat potato chips were also compared to the overall acceptabilities of flat and corrugated control potato chips having conventional oil contents. These results are shown in Table 2 below and are depicted in the FIG. 3 bar graph, where the vertical axis is a measure of overall acceptability. In FIG. 3 the Product Number is shown beneath each respective bar. The value of amplitude/period for each respective Product Number is also shown parenthetically. From this Figure, it is appreciated that low fat potato chips having amplitude/period values between 0.35 and 0.5 possess overall consumer acceptabilities that about equal or exceed the comparable values for potato chips with conventional fat contents.

TABLE 2

SENSORY RESPONSES TO PRODUCTS

| Product No. | Texture Acceptability | Flavor Acceptability | Shape Acceptability | Overall Acceptability |
|---|---|---|---|---|
| C-1* | 6.6 | 6.1 | 6.4 | 6.0 |
| C-2 | 6.7 | 6.5 | 6.8 | 6.3 |
| 3* | 5.4 | 5.6 | 6.1 | 5.3 |
| 4 | 5.6 | 5.7 | 6.5 | 5.5 |
| 5 | 6.5 | 6.1 | 6.7 | 6.3 |
| 6 | 6.2 | 6.4 | 7.0 | 6.1 |
| 7 | 6.0 | 5.8 | 6.0 | 5.9 |

*Flat cut chip having approximately smooth slice surface.

The invention disclosed herein provides novel low fat potato chips having consumer acceptabilities based on product characteristics that have been heretofore unattainable. It is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. A low fat potato chip having a fat content of less than about twenty-five weight percent, based on the total weight of the potato chip made from potato slices, a web thickness of about 2 mm, and having a corrugated cross-sectional configuration wherein the value of amplitude/period ranges from about 0.35 to about 0.45 and wherein ridges on one face of the corrugated chip are in-phase with grooves on the opposing face of the corrugated chip.

2. The low fat potato chip of claim 1 wherein the amplitude ranges from about 1.03 mm to about 1.95 mm.

3. A low fat potato chip having a fat content of less than about twenty-five weight percent, based on the total weight of the potato chip, a web thickness of about 2 mm, and having a corrugated cross-sectional configuration wherein the amplitude ranges from about 0.80 mm to about 2.20 mm; wherein the value of amplitude/period ranges from about 0.35 to about 0.45; and wherein ridges on one face of the corrugated chip are in-phase with grooves on the opposing face of the corrugated chip.

4. The low fat potato chip of claim 3 wherein the amplitude ranges from about 1.03 mm to about 1.95 mm.

* * * * *